Oct. 28, 1947.  S. T. FORESMAN  2,429,930
METHOD AND APPARATUS FOR BALANCING FLUID COUPLINGS
Filed April 23, 1945  4 Sheets-Sheet 1
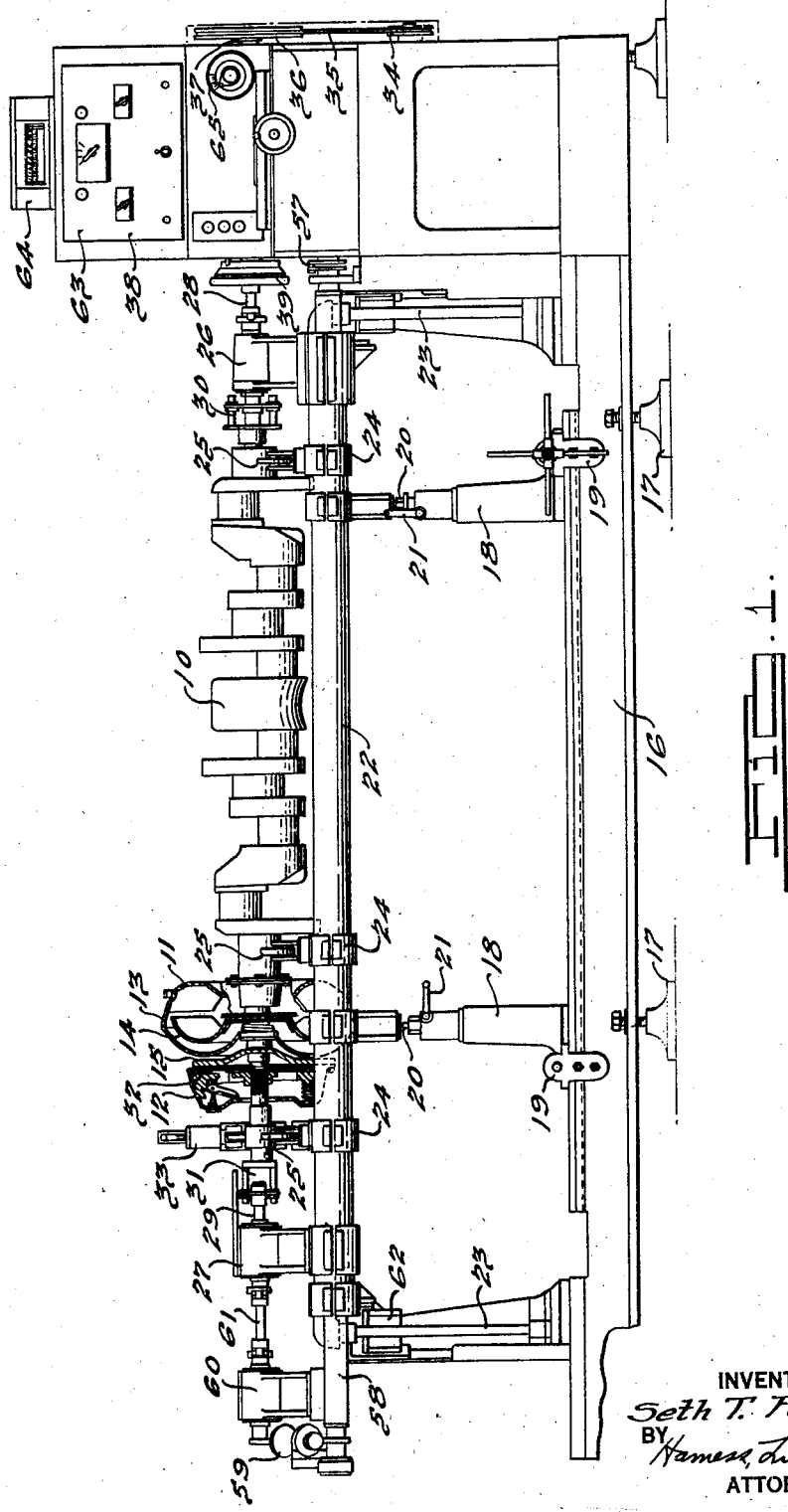
INVENTOR
Seth T. Foresman
BY
ATTORNEYS Oct. 28, 1947. S. T. FORESMAN 2,429,930
METHOD AND APPARATUS FOR BALANCING FLUID COUPLINGS
Filed April 23, 1945 4 Sheets-Sheet 2
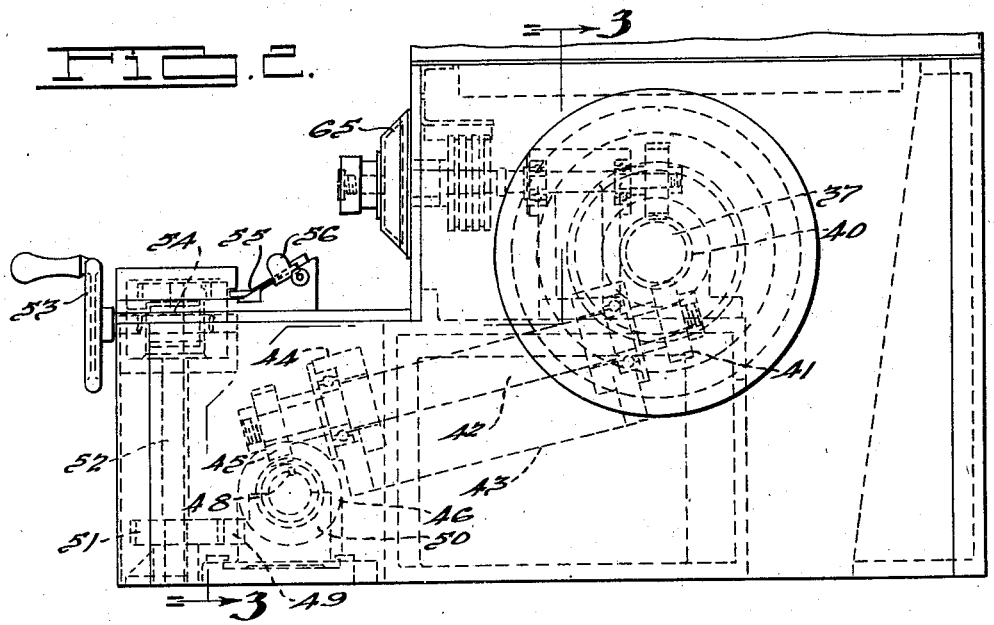
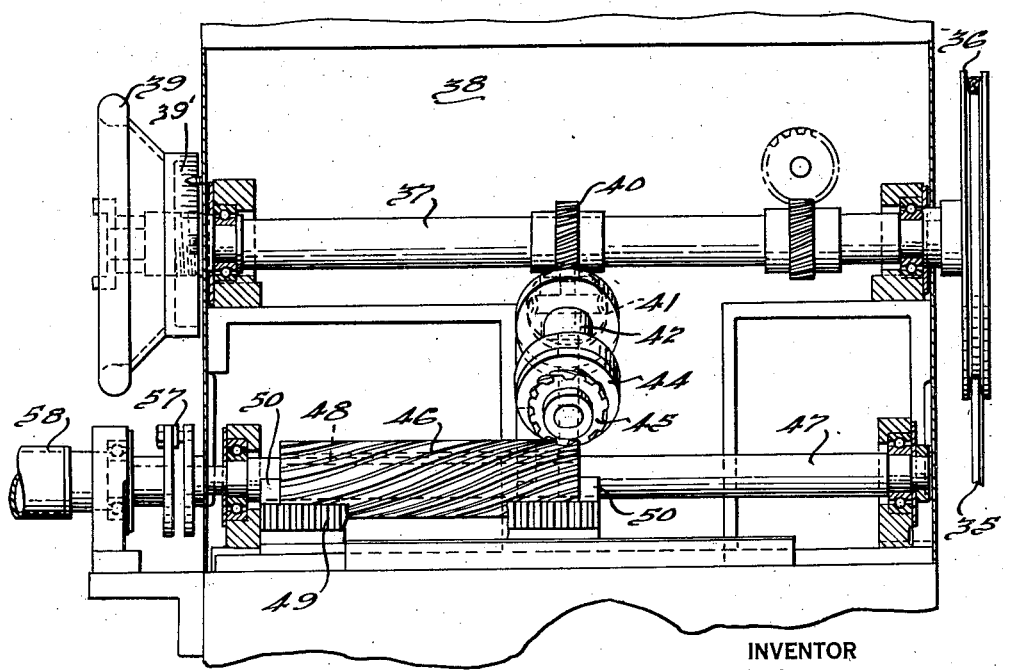
INVENTOR
Seth T. Foresman.
BY
ATTORNEYS.

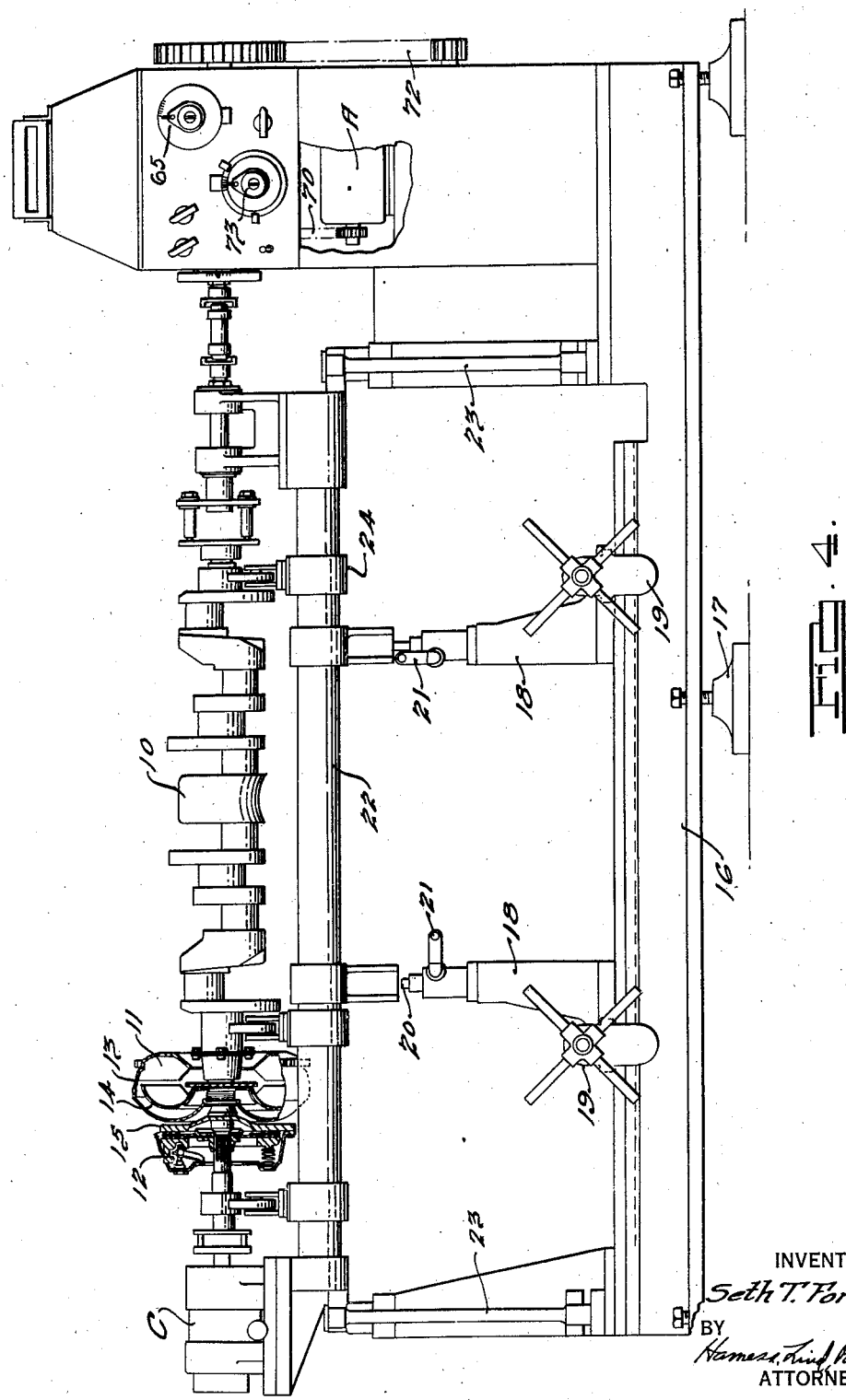

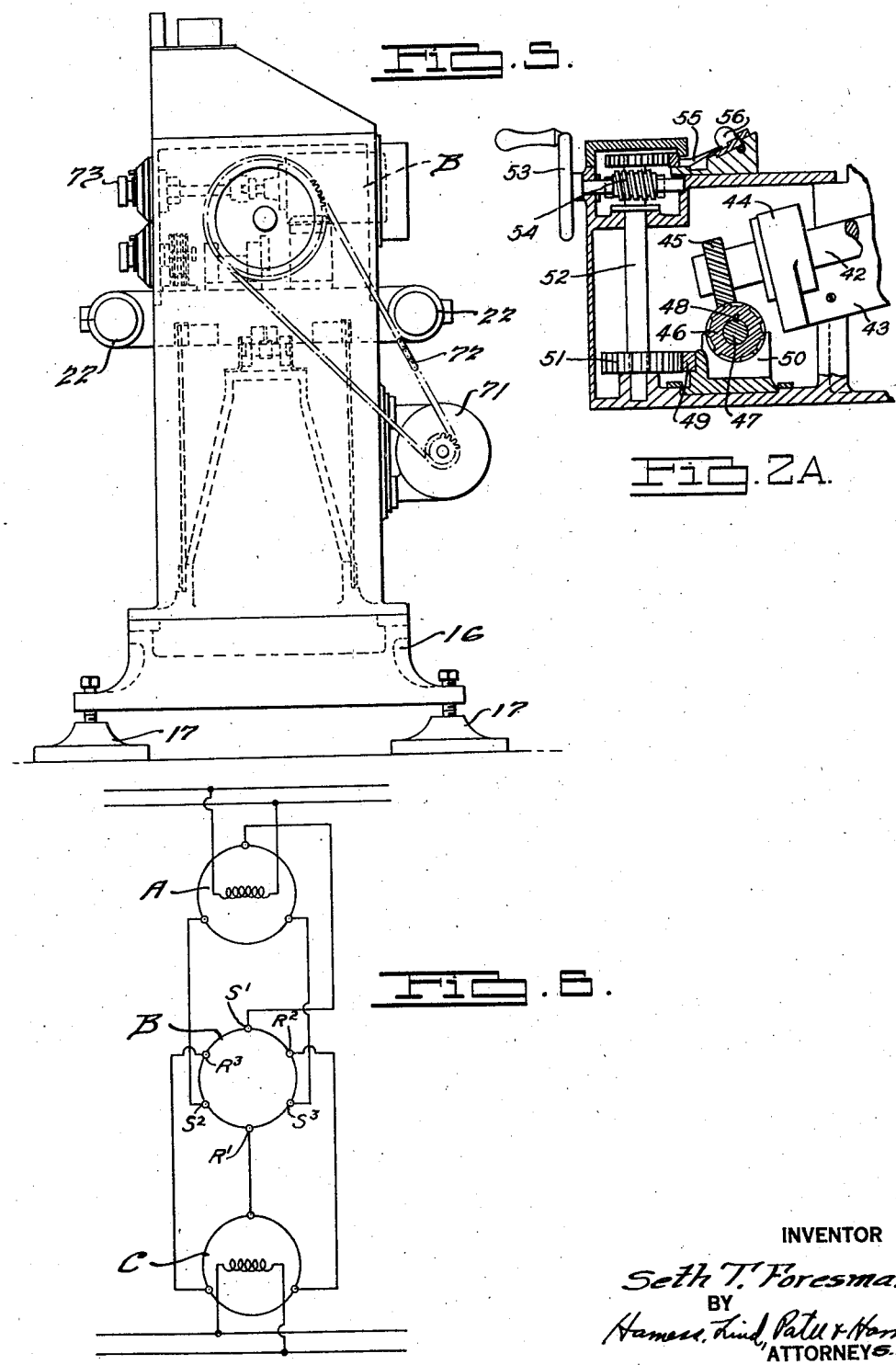

Patented Oct. 28, 1947

2,429,930

UNITED STATES PATENT OFFICE 2,429,930

METHOD AND APPARATUS FOR BALANCING FLUID COUPLINGS

Seth T. Foresman, Royal Oak, Mich., assignor to Chrysler Corporation, Highland Park, Mich., a corporation of Delaware Application April 23, 1945, Serial No. 589,843

20 Claims. (Cl. 73—66)

This invention relates to methods and apparatus for determining the magnitude and angular position of the unbalance in each of the members of a rotatable assembly comprising a plurality of relatively rotatable members.

The invention relates particularly to methods and apparatus for determining the unbalance in the runner and impeller members of a fluid coupling, but it is desired to point out at the outset that the method and apparatus described herein may be used for determining the unbalance in plural rotor assemblies other than fluid couplings, and in such assemblies having more than two relatively rotatable members.

In the co-pending application of Seth T. Foresman and William A. Hunter, Serial No. 259,296, filed in the United States Patent Office on March 1, 1939, (now Patent No. 2,279,977, issued April 14, 1942), a method for determining the magnitude and angular position of the unbalance in the component parts of a fluid coupling is described and claimed.

The method about to be described is an improvement over that described and claimed in the aforesaid Foresman et al. application in that it enables the operator to determine the unbalance in each of the component parts or members of the fluid coupling in a shorter time and without stopping the balancing machine during the operation.

It is accordingly the principal object of the present invention to provide an improved means and method for measuring the unbalance in fluid couplings which is quicker, easier and more economical than that now used.

An additional object is to provide means for measuring said unbalance which will enable the operator to take all necessary readings without having to stop the balancing machine for the purpose of indexing one of the fluid coupling members relatively to the other, or for other purposes.

A further object is to provide means whereby the operator can separate the total resultant unbalance of the rotatable assembly into its components by the use of simple arithmetic without the use of graphs or involved mathematics.

Fluid couplings of the type used in automotive transmissions consist essentially of an enclosing housing which carries the fluid impelling vanes and a runner which carries the driven vanes. The runner is rotatably mounted inside the housing and in use rotates at a different speed than the housing. The difference in rotative speed (called "slip") may be very small or it may be 100% in accordance with the conditions under which the coupling is operating. There is, however, always some slip present during coupling operation, therefore both of the members thereof must be in dynamic balance.

There are three factors which contribute to the unbalance of a coupling taken as a whole, viz., unbalance in the impeller housing and entrained fluid, unbalance in the runner about its own rotational axis, and unbalance in the runner due to eccentricity between the axes of rotation of the impeller and runner. The angular position of the first and third of these is constant relatively to the rotational axis of the impeller, but the angular position of the second is constantly changing because of the slip.

While the method disclosed in the aforesaid co-pending application of Foresman et al. constituted a vast improvement over the balancing procedure in use prior to the development thereof, one of the major obstacles to large quantity production of fluid couplings resided in the slowness of the balancing operation until the invention by applicant of the method and apparatus described and claimed herein.

It is a further object of the invention, therefore, to provide apparatus for quickly and accurately determining the component unbalances in a fluid coupling.

The apparatus necessary for carrying out the present invention involves a modification of commercial types of balancing machines. Any type of balancing machine may be used provided that it has means for quickly and accurately measuring both the amount and angular position of the total running unbalance of a part or assembly placed on the machine. For the purpose of illustration, a balancing machine of the type designated "EO" manufactured by the Tinius Olsen Testing Machine Company, Philadelphia, Pennsylvania, has been selected, but it is emphasized that any other machine giving similar measurements may be employed. For a full description of this machine, see "Balancing Machine Bulletin No. 26, Type EO, Static-Dynamic," (Copyright 1943) which is published by the Olsen Co.

In the drawings:

Fig. 1 is a front elevation of a testing machine incorporating applicant's invention with a workpiece assembly on the machine. Certain parts of the workpiece assembly have been broken away for the purpose of more clearly showing the details thereof.

Fig. 2 is an elevation of the Fig. 1 machine as seen from the right end thereof.

Fig. 2A is a part-sectional view of the mechanism for controlling the indicating pointer 55 of Fig. 2.

Fig. 3 is a sectional view along line 3—3 of Fig. 2.

Fig. 4 is a front elevation of a modified form of the invention.

Fig. 5 is an end elevation of the Fig. 4 machine.

Fig. 6 is a wiring diagram of the "Selsyn" motors used in the Fig. 4 machine.

Referring to Figs. 1 to 3, it may be seen that the workpiece assembly consists of a crankshaft 10, a fluid coupling 11, and a friction clutch 12. In practice, the crankshaft and clutch are individually balanced before assembly with the fluid coupling and the final balancing operation involves the determination of the unbalance in each of the fluid coupling members and in the entrained fluid after the fluid coupling has been assembled with the crankshaft and clutch. This procedure is necessary to preclude the possibility of a badly unbalanced assembly which might result from a service operation on the vehicle involving the replacement of the clutch, coupling or crankshaft. It is obvious that unless the crankshaft and clutch were first balanced separately, damage to one of the elements of the assembly would require replacement of the entire assembly instead of just the damaged element.

In the set-up illustrated, the crankshaft 10 is rigidly secured to the impeller 13 of the coupling and the runner 14 thereof is rigidly secured to the driving plate 15 of the clutch 12. The parts are thus ready for assembly into an internal combustion power plant immediately that the final balancing operation has been completed.

The balancing machine comprises a bed 16 adapted to be supported on the floor through leveling pads 17 in accordance with standard practice. Right and left hand standards 18 adjustable longitudinally of the bed 16 by means of adjusting mechanism 19 support right and left pivots 20 which are vertically adjustable by means of levers 21. In the operation presently to be described the right pivot 20 only is used, the left pivot being inactive as illustrated in Fig. 1.

The cradle of the machine comprises a pair of hollow tubes 22 which are disposed in parallelism and supported on the bed 16 by the flexible rods 23. There are four of the latter, two at each end of the machine for supporting the ends of the respective tubes and they support the cradle in such manner that the vibrations of the cradle caused by unbalance in the workpiece are confined to a horizontal plane.

On the cradle tubes 22 are fixed three brackets 24 on which are journalled pairs of rollers 25 which rotatably support the workpiece assembly, a suitable hold-down bracket being provided at 33. A headstock 26 and a tailstock 27 rotatably support driving shafts 28 and 29 respectively. The forward end of the crankshaft 10 is connected to the shaft 28 by a universal connection 30, and the driven disc 32 of the friction clutch 12 is connected through a universal connection 31 with the shaft 29.

The shaft 28 is adapted to be driven by an electric motor (not shown) which is connected to the shaft through a pulley 34, belt 35 and a pulley 36, the latter being carried by a shaft 37 supported in the control frame 38 of the machine (Fig. 3). A handwheel 39 incorporating the usual angle reference disc 39' (see Fig. 3) is carried by the shaft 37.

The shaft 37 carries a spiral gear 40 which is adapted to mesh with a mating gear 41 carried by a cross shaft 42. The latter is mounted in a bracket 43 having bearings 44 for rotatably supporting the same and carries a spiral gear 45 which is adapted to mesh with an elongated sleeve gear 46. The latter is carried by a shaft 47 and is slidable thereon, a key 48 forming the driving connection.

The sleeve gear 46 is slidable by means of a rack 49 which is provided with yoke portions 50 engaging the gear at each end thereof. The rack 49 is engaged by a gear 51 carried by a shaft 52, the latter being operably connected with a handwheel 53 through a worm and wheel gearing generally indicated at 54. It is apparent from the disclosure thus far that the sleeve gear 46 may be slid along the shaft 47 by rotating the handwheel 53. Inasmuch as the gear 45 and its associated mechanism are directly connected to the motor pulley 34 by the belt 35, axial sliding of the gear 46 will effect rotation of the shaft 47 with respect to the shaft 37. An indicating pointer 55 and a scale 56 calibrated to indicate in degrees the relative rotation of shaft 47 caused by rotation of the handwheel 53 is provided.

The shaft 47 is connected by a suitable universal connection 57 with a shaft 58 which is suitably supported on the machine between the tubes 22. The shaft 58 is connected to the shaft 29 through a transfer gearset 59 which may be of any suitable form. An auxiliary tailstock 60 and a shaft 61 are provided for convenience of assembly.

A pick-up unit 62 is supported at the left end of the machine and is suitably connected with the control panel, generally indicated at 63. The latter is provided with a meter 64 for reading the amount of unbalance in the workpiece assembly, a scale 65 for reading the angle from the reference line at which the unbalance is located, and various control apparatus for facilitating the taking of readings. Inasmuch as the details of the control and pick-up mechanism are not part of the present invention, and in view of the fact that any type of mechanism may be used, provided it will enable the amount and angular position of the unbalance in the workpiece to be easily and rapidly obtained, this part of the apparatus will not be described. However, the Olsen Co. Bulletin No. 26, referred to above, has a full description of this part of the apparatus. When balancing a fluid coupling on the machine, the complete assembly consisting of crankshaft, fluid coupling (which has been filled with fluid to proper level) and clutch is placed on the rollers 25 and the driving connections 30 and 31 are affixed. The motor is then started and the assembly is allowed to come up to the desired speed. It has been found advantageous to measure the unbalance while the assembly is rotating at a speed of approximately 600 R. P. M., this speed approximating average operating conditions for balancing fluid couplings of the type illustrated.

After the proper speed has been attained, the handwheel 53 is rotated backward and forward until the maximum reading is obtained on the meter 64. The latter is suitably connected to the pick-up unit 62 in such manner that it indicates the unbalance in the workpiece. Rotation of the handwheel 53 shifts the sleeve gear 46 along the shaft 47 and effects a corresponding advance or retardation of the rotation of shaft 47 relatively to shaft 37.

As is apparent from the drawings, the shafts 37 and 47 are connected to rotate in synchronism, the gears 49 and 46 being of the same diameter. Therefore, the runner 14 and clutch 12 will be rotated in synchronism with the impeller 13 and crankshaft 10, the transfer gearing 59 being a 1 to 1 ratio gearing. It is therefore clear that a selected point on the runner 14 can be made to "clock" with a selected point on the impeller 13 during rotation of the work. By rotating the handwheel 53, the runner 14 can be made to lead or lag the impeller 13 by a complete revolution.

Maximum reading of the meter 64 then indicates that the runner unbalance and the impeller unbalance are axially aligned on the same side of the axis of the assembly. The magnitude and angular position of this resultant running unbalance may now be read from the dials of the machine and recorded.

Next, the handwheel 53 is rotated to produce a 180° rotation of the runner 14 relatively to the impeller 13 thereby to diametrically align the component unbalances on opposite sides of the axis of the assembly. The magnitude of the resultant unbalance is again read. This reading usually will be less than the first reading because the unbalance in the runner has been rotated to a position 180° removed from its former position with relation to the impeller unbalance. This second reading then will give the minimum resultant unbalance in the assembly and with the maximum and minimum unbalances known, together with the angular position of each, it is a simple matter to compute the component unbalances in each of the members.

At the time the minimum resultant unbalance is read, the angle is also checked for the purpose of determining in which of the two members the greater unbalance exists. If the angle remains the same (as for the maximum reading) it is clear that the larger unbalance is in the impeller or relatively fixed member. If the angle shifts 180° it of course indicates that the larger unbalance is in the runner or relatively rotatable member.

For example, let it be assumed that the maximum reading is 3 ounce inches at 12° angle with respect to a reference point and that the minimum reading is 1 ounce inch at the same angle. Then the sum of the readings divided by two will be the unbalance in the impeller or relatively fixed member, and the difference between the readings divided by two will be the unbalance in the runner or relatively rotatable member. In this instance, the unbalance in the impeller is $$\frac{3+1}{2} = 2 \text{ ounce inches}$$

and the unbalance in the runner is $$\frac{3-1}{2} = 1 \text{ ounce inch}$$

As the angular positions of both unbalances are known, it is a simple matter for the operator to attach correcting weights to the lighter side of the axis of each of the members, or to drill material from the heavier side as desired.

As the angular positions of both unbalances are known, it is a simple matter for the operator to attach correcting weights to the lighter side of the axis of each of the members, or to drill material from the heavier side as desired.

In correcting the runner for unbalance, the material is added or removed from the clutch plate 15 inasmuch as it is impossible to get at the runner itself without disassembling the coupling. While it is convenient to balance the coupling after its assembly with the crankshaft and clutch, my method is by no means limited to such a procedure. If desired, the coupling can be balanced before its assembly with the crankshaft and clutch with equally good results.

Figs. 4–6 illustrate a modification of the invention wherein the means for securing the 180° relative rotation of the runner comprises a set of self-synchronous electric motors. These self-synchronous motors are commercially available and are similar to 3-phase induction motors, but have two definite field poles, the windings of which are connected to a single-phase alternating current source of excitation.

In the present instance, a self-synchronous differential system is used consisting of a transmitter, a receiver and a differential motor. The wiring of such a system is diagrammatically illustrated in Fig. 6. The rotor winding leads $R^1$, $R^2$, and $R^3$ of the differential motor B are brought out by means of collector rings and the circuit is so arranged that the differential motor acts to modify the electrical angle transmitted by the transmitter A to the receiver C. As can be seen from the diagram, the stator of motor B is connected to the stator of motor A, and the rotor is connected to the stator of motor C. $S^1$, $S^2$, and $S^3$ are the stator leads of motor B. The characteristic operation is such that the receiver (which is free to rotate) will take up a position which will either be the sum or difference of the angles applied to the transmitter A and the motor B. Thus, if the transmitter A is fixed in position, and the differential motor B is displaced a certain angle, the receiver C being free to rotate will turn through the same angle.

Further information on the operation and characteristics of self-synchronous motors may be obtained from catalog bulletin GEA–2176 published August 1935 by the General Electric Company, Schenectady, New York, particularly page 4 thereof which describes the differential "Selsyn" system.

In the set-up illustrated in Fig. 4, the transmitter A is driven from the main driving spindle of the machine through a chain 70, the spindle itself being driven by a motor 71 and chain 72 (Fig. 5). The receiver C is rotatably mounted at the tailstock end of the machine and drives the runner 14 and clutch 12 in synchronism with the shaft 10 and impeller 11. The differential motor B is mounted behind the control panel and is rotatable by the knob 73.

The operation of the Fig. 4 machine is substantially identical with that of the Fig. 1 machine, the 180° displacement of the runner being obtained by means of the self-synchronous motors instead of through a positive gear means.

With some types of balancing machines having sensitive electrical pick-ups for indicating the running unbalance by visual indication on a meter, it has been found advantageous to vary the method of operation as described above and find the minimum unbalance in the assembly first.

When using such balancing machines (of which the Olsen Type EO is an example) it has been observed that the resultant unbalance causes a greater variation in meter reading when the component unbalances are nearly cancelling rather than when they are nearly adding. In other words, there is a greater variation in reading on the meter 64 when the operator has the component unbalances nearly aligned diametrically on opposite sides of the rotational axis than there is when the component unbalances are near axial alignment on the same side of the axis.

The sensitivity of the meter varies in accordance with the following ratio:

$$\frac{\text{Impeller unbalance} + \text{runner unbalance}}{\text{Impeller unbalance} - \text{runner unbalance}}$$

When this is reduced to actual quantities, it may be seen that when one component unbalance is 10 inch-ounces and the other component unbalance is 1 inch-ounce, the ratio in sensitivity will be as 11 is to 9. When the component unbalances are in this proportion, the gain obtained in determining the minimum unbalance first is insignificant. However, when one component unbalance is 10 inch-ounces and the other is 5 inch-ounces, the ratio in sensitivity is three times. Further, when the two component unbalances are approximately equal, as for example, 11 inch-ounces and 10 inch-ounces, the sensitivity is 21 times as sharp on the minimum unbalance reading as on the maximum reading.

The sensitivity may be illustrated as follows. For example, two masses under consideration of known relatively different unbalance may be progressively relatively indexed in small equal increments for a total of 360° starting from the known positions of the masses at which either the maximum or minimum unbalance of the two masses occurs when locked together, and the amount of unbalance determined by a reading taken at each increment of relative indexing of the masses. Then by plotting the observed unbalance readings against the indexed angles between the unbalances at which the readings were taken a curve may be drawn through the points plotted and the curve will, of course, include two oppositely directed apices occurring 180° apart at the relative angles at which maximum and minimum unbalance occurs. These apices are relatively different in that the curve in the region of the apex at which the minimum unbalance occurs is such that this apex is relatively more pointed or sharper than that at which the maximum unbalance occurs. In other words, the net unbalance of the two masses increases more per degree of indexing in each direction from the point of minimum unbalance than the net unbalance of the two masses decreases per degree of indexing in each direction from the point of maximum unbalance. This means that in practice an operator can in many instances much more quickly and accurately determine the minimum unbalance reading than the maximum unbalance reading by the use of this method in connection with balancing machines of any appropriate type including that illustrated.

Having thus described various embodiments of my apparatus and method for purposes of illustration, I wish to point out that my invention in its broader aspects is not to be construed as limited except as defined in the claims appended hereto.

This application is a continuation-in-part of my co-pending application Serial No. 384,448 filed March 21, 1941.

I claim:

1. In a balancing machine for determining the component unbalances in the relatively rotatable members of a rotatable assembly, a vibratory support for the assembly; means for synchronously rotating the relatively rotatable members, and means including a pair of interconnected synchronous motors for varying the rotative position of one of the members relatively to the assembly during rotation thereof.

2. In a balancing machine for determining the component unbalances in each of a pair of coaxially mounted relatively rotatable members, a motor; a vibratory support for the members; means including a drive shaft for connecting the motor to one of the members for rotating the same; and means independent of said shaft connecting the other member with the motor for rotation thereby at the speed of the said first member including means for advancing and retarding the rotative position of said second member relatively to said first member during rotation of the members.

3. In a balancing machine for balancing fluid couplings, a vibratory support for the coupling under test; means for synchronously rotating the impeller and the runner of said coupling; and means for varying the relative rotative positions of the impeller and runner during said rotation.

4. In a balancing machine for balancing fluid couplings, a vibratory support for the coupling under test; a motor; a drive shaft driven by the motor; means connecting the drive shaft to one of the coupling members; means including differential gearing for connecting the drive shaft to the other coupling member; and control means for said gearing operable during rotation of the members to vary the relative rotative position thereof.

5. In a balancing machine for balancing fluid couplings, a vibratory support for the coupling under test; a motor; a drive shaft driven by the motor; means connecting the drive shaft to one of the coupling members; a second shaft connected to the other coupling member; an elongated spiral gear slidably carried by said second shaft; a spiral pinion driven by said first shaft disposed in mesh with said gear; and means for sliding said spiral gear along said second shaft.

6. In a balancing machine for balancing fluid couplings, a vibratory support for the coupling under test; a motor; a drive shaft driven by the motor; means connecting the drive shaft to one of the coupling members; an electrical self-synchronous transmitter driven by said drive shaft; an electrical self-synchronous receiver drivingly connected to the other coupling member and electrically connected to said transmitter; and means for varying the relative rotative positions of the coupling members during rotation thereof including a differential electrical self-synchronous machine connected to said transmitter and receiver.

7. The method of balancing fluid couplings which comprises rotating the coupling members in synchronism; advancing or retarding one of the members relatively to the other during rotation thereby to align the component unbalances and observing the magnitude and angular position of the total resultant running unbalance; then computing the component unbalances in the members.

8. In a balancing machine, a vibratory support for a rotatable test body having relatively rotatable cooperating parts, a main driving spindle, a driving connection from said spindle to a rotatable part of said test body, a driving connection from said spindle to a second rotatable part of the test body, and including a shaft, a spiral driving gear therefor, means to adjust said spiral driving gear to effect angular displacement of the second rotatable part relatively to the first rotatable part to bring unbalance in said parts into phase, and means to visibly indicate exterior of the machine the position to which said spiral driving gear has been adjusted.

9. The method of separating the component unbalances of an assembled unit having relatively rotatable parts which comprises rotating said parts at desired synchronous speed about the axis of the unit; rotatively advancing or retarding one of said parts relatively to the other during said rotation thereby to align the component unbalances in the parts on the same side of said axis, determining the amount and angular position of the total running unbalance of the unit while the component unbalances are so aligned; advancing or retarding one of the parts 180° with respect to the other part thereby to align the component unbalances on opposite sides of said axis; determining the amount and angular position of the total running unbalance of the unit while the component unbalances are so aligned; then computing the component unbalances.

10. In a balancing machine, a vibratory support for an assembled unit to be tested for unbalance and having relatively rotatable members, means to independently revolve each of said members at a definite speed, and means to effect an angular displacement of one of said members during its revolution to bring the unbalance in different members into phase.

11. In a balancing machine, a vibratory support for a fluid drive assembly having relatively rotatable driving and driven members and a crankshaft to which said driving member is fixed, means to revolve said crankshaft, means to revolve said driven member, and means to effect angular displacement of said driving member relatively to said driven member during the revolution of said members.

12. In a balancing machine for balancing fluid couplings, a vibratory support for the coupling under test; a motor; a drive shaft driven by the motor; means connecting the drive shaft to one of the coupling members; a self-synchronous transmitter driven by said drive shaft; a self-synchronous receiver drivingly connected to the other coupling member and electrically connected to said transmitter; and means for varying the relative rotative positions of the coupling members during rotation thereof.

13. In a balancing machine for balancing fluid couplings and the like, a vibratory support for the coupling under test; a motor; a drive shaft driven by the motor; means connecting the drive shaft to one of the coupling members; a self-synchronous transmitter driven by said drive shaft; a self-synchronous receiver drivingly connected to the other coupling member and electrically connected to said transmitter; and means for varying the relative rotative positions of the coupling members during rotation thereof including differential means operably connected with said self-synchronous transmitter and receiver.

14. The method of separating the component unbalances of an assembled unit having relatively rotatable parts which comprises rotating said parts at desired synchronous speed about the axis of the unit; rotatively advancing or retarding one of the parts relatively to the other during said rotation thereby to align the component unbalances in the parts, determining the amount and angular position of the total running unbalance of the unit while the component unbalances are so aligned; advancing or retarding one of the parts 180° with respect to the other part; determining the amount and angular position of the total running unbalance of the unit with said one part so advanced or retarded; then computing the component unbalances.

15. The method of separating the component unbalances of an assembled unit having relatively rotatable parts which comprises rotating said parts at desired synchronous speed about the axis of the unit; rotatively advancing or retarding one of the parts relatively to the other during said rotation thereby to align the component unbalances in the parts, on opposite sides of said axis, determining the amount and angular position of the total running unbalance of the unit while the component unbalances are so aligned; advancing or retarding one of the parts 180° with respect to the other part thereby to align the component unbalances on the same side of said axis; determining the amount and angular position of the total running unbalance of the unit while the component unbalances are so aligned; then computing the component unbalances.

16. The method of separating the component unbalances of an assembled unit having relatively rotatable parts which comprises rotating said parts at desired synchronous speed about the axis of the unit; rotatively advancing or retarding one of the parts relatively to the other during said rotation thereby to axially align the component unbalances in the parts, determining the amount and angular position of the total running unbalance of the unit while the component unbalances are so aligned; advancing or retarding one of the parts 180° with respect to the other part thereby to diametrically align the component unbalances; determining the amount and angular position of the total running unbalance of the unit while the component unbalances are so aligned; then computing the component unbalances.

17. The method of separating the component unbalances of an assembled unit having relatively rotatable parts which comprises rotating said parts at desired synchronous speed about the axis of the unit; rotatively advancing or retarding one of the parts relatively to the other during said rotation thereby to diametrically align the component unbalances in the parts, determining the amount and angular position of the total running unbalance of the unit while the component unbalances are so aligned; advancing or retarding one of the parts 180° with respect to the other part thereby to axially align the component unbalances; determining the amount and angular position of the total running unbalance of the unit while the component unbalances are so aligned; then computing the component unbalances.

18. In a balancing machine for determining the component unbalances in the relatively rotatable members of a rotatable assembly, a vibratory support for the assembly; driving means including independent power transmission mechanism for synchronously rotating the relatively rotatable members of the assembly; and means operable during rotation of the assembly for varying the rotative position of one of the members by a predetermined amount.

19. In a balancing machine for determining the component unbalances in the relatively rotatable members of a rotatable assembly, a vibratory support for the assembly; driving means including independent power transmission mechanism for synchronously rotating the relatively rotatable members of the assembly; and means for varying the rotative position of one of the members relatively to the assembly during rotation thereof.

20. In a balancing machine for determining the component unbalances in the relatively rotatable members of a rotatable assembly, a vibratory support for the assembly; driving means including independent power transmission mechanism for synchronously rotating the relatively rotatable members of the assembly; and differential gear means for varying the rotatable position of one of the members relatively to the assembly during the rotation thereof.

SETH T. FORESMAN.

REFERENCES CITED

The following references are of record in the file of this patent:

UNITED STATES PATENTS

| Number | Name | Date |
|---|---|---|
| 2,241,637 | Ernst et al. | May 13, 1941 |
| 2,279,977 | Foresman et al. | Apr. 14, 1942 |